United States Patent [19]

Thompson et al.

[11] 4,178,421
[45] Dec. 11, 1979

[54] METHOD FOR DISPERSING AN ADDITIVE INTO A THERMOPLASTIC RESIN

[75] Inventors: Donald F. Thompson, Elburn; Joseph M. Mizenko, Naperville, both of Ill.; Elmer Sivak, Highland, Ind.

[73] Assignee: Standard Oil Company (Indiana), Chicago, Ill.

[21] Appl. No.: 881,907

[22] Filed: Feb. 27, 1978

[51] Int. Cl.² .................................................. C08K 5/09
[52] U.S. Cl. ................................................ 525/4; 525/5
[58] Field of Search .......... 260/29.6 WQ, 34.2, 42.55; 526/4, 5

[56] References Cited

U.S. PATENT DOCUMENTS

| | | | |
|---|---|---|---|
| 3,207,735 | 9/1965 | Wijga | 260/31.2 |
| 3,207,736 | 9/1965 | Wijga | 260/31.2 |
| 3,207,737 | 9/1965 | Wales | 260/31.2 |
| 3,207,738 | 9/1965 | Wijga | 260/31.2 |
| 3,207,739 | 9/1965 | Wales | 260/31.2 |
| 3,268,499 | 8/1966 | Wales | 260/93.7 |
| 3,275,715 | 9/1966 | O'Leary | 260/889 |
| 3,299,029 | 1/1967 | Binsbergen | 260/93.7 |
| 3,326,880 | 6/1967 | Binsbergen | 260/93.7 |
| 3,327,020 | 6/1967 | Binsbergen | 260/878 |
| 3,327,021 | 6/1967 | Binsbergen | 260/878 |
| 3,637,571 | 1/1972 | Polovina | 260/37 P |
| 3,637,634 | 1/1972 | Marinaccio | 526/4 |
| 3,761,442 | 9/1973 | Nangeroni | 260/42.55 |
| 4,045,403 | 8/1977 | Lever | 260/42.42 |

FOREIGN PATENT DOCUMENTS 1182001 2/1970 United Kingdom.

Primary Examiner—Paul R. Michl

[57] ABSTRACT

An improved method for dispersing an additive into a thermoplastic resin comprising: (1) thoroughly mixing an aqueous solution of said additive with said thermoplastic resin; (2) applying both sufficient heat and shear to rapidly volatilize said aqueous solvent and to form a molten flux of said thermoplastic resin and said additive; and (3) recovering said thermoplastic resin with said additive dispersed therein.

15 Claims, No Drawings

METHOD FOR DISPERSING AN ADDITIVE INTO A THERMOPLASTIC RESIN

BACKGROUND OF THE INVENTION

1. Field of the Invention

This invention relates to the process for compounding additives and thermoplastic resins.

2. Prior Art

The desirability of introducing additives into thermoplastic resins to improve processability is well known. Nucleating agents to increase the rate of crystallization of thermoplastic resins, in particular, are also well known.

Examples of prior art methods for incorporating an additive into a thermoplastic resin are: (1) dry blending two powders either with or without wetting agents in either a Henschel Mill, a Waring Blendor or a ball mill, wherein one of the powders comprises a thermoplastic resin and the other comprises an additive, then mlet mixing to form a molten mass by means of either a Banbury Mill or on a two-roll mill, and recovering that mass; (2) the method of (1) except using mineral oil as a wetting agent and a three-roll paint mill to form a paste in place of a Henschel Mill, a Waring Blendor, or a ball mill; and (3) using a mortar and pestle with and without wetting agents to grind an additive into a very fine powder followed by extrusion compounding that powder with a second powder on a Killian compounding extruder.

Examples of United States patents directed to incorporating an additive or a nucleating agent into a polyolefin or other thermoplastic resin are U.S. Pat. Nos. 3,207,735 (1965), 3,207,736 (1965), 3,207,737 (1965), 3,207,738 (1965), and 3,207,739 (1965), 3,268,499 (1966), and 4,045,403 (1977). Of particular interest is 3,207,739 where sodium salts of aliphatic and aromatic carboxylic acids are used in crystallizable polypropylene. One disclosed method for incorporating an additive into a resin is to add said additive to the washed polymerization slurry followed by dring of the slurry to form a dry mixture of the additive and polymer. Other disclosed methods involve adding the additive to either a molten resin or a dry resin which is either in the form of a powder or a pellet. In U.S. Pat. No. 3,207,735, the same methods as in U.S. Pat. No. 3,207,739 are disclosed but in addition, in one of the examples, there is set out the use of a solution of an additive in acetone or other suitable volatile solvent which is mixed into a polypropylene powder. The solvent is then thoroughly removed by evaporation under drying conditions and the resulting material also in the form of a powder further homogenized by rolling in a bottle.

Still another method for dispersing an additive into a thermoplastic resin is disclosed in the following United States Pat. No. 3,299,029 (1967) 3,326,880 (1967), 3,327,020 (1967) and 3,327,021 (1967). The method disclosed involved first mixing an aqueous solution of the additive into a crystalline polymer and then precipitating the additive with the aid of a salting-out agent. The precipitated additive presumably coats out on the polymer. The water and the salting-out agent are subsequently removed by mechanical means, for instance by filtration or centrifuging.

U.S. Pat. No. 3,275,715 (1966) discloses the need to use high boiling organic liquids which swell powdered polyethylene or powdered propylene as the solvent for an additive which is to be incorporated into said polyethylene or said polypropylene. The patent states however, that the use of low boiling polar-type solvents such as acetone, methyl-ethyl ketone, methanol, ethanol, etc. to dissolve a desired additive to form a solution thereof results in an inadequate dispersion in the following process: tumble blending said solution and a polyolefin, which may be in the form of a powder, followed by flashing off of the solvent.

British Pat. No. 1,182,001 (published Feb. 25, 1970) avoids the difficulties associated with preparing dispersions with metal salts of carboxylic and sulphonic acids by employing crystallization promoter combinations which themselves crystallize at temperatures below the melting point of the polyolefins in which they are effectively incorporated and which combinations preferably are compatible with the molten polyolefin at least to the extent of the concentrations being employed.

U.S. Pat. No. 3,637,634 (1972) discloses a variation on the use of saltingout agents to produce a fine precipitate of sodium benzoate from a water solution thereof. The patent states that under carefully controlled conditions the following process thoroughly disperses sodium benzoate in polypropylene: dissolving sodium benzoate in water, combining the sodium benzoate solution with excess alcohol or other non-solvents for sodium benzoate to form a gel-like slurry, admixing polypropylene powder or particles and said slurry with agitation to ensure thorough mixing, separating the solids from the resulting polypropylene-containing slurry by filtration, centrifugation, or the like, drying the filter cake at an elevated temperature, and recovering polypropylene powder or particles containing finely divided sodium benzoate.

All of these methods have significant drawbacks when seeking to disperse more than 0.05% by weight of sodium benzoate within polypropylene. One drawback is that often one or more discontinuities in the form of specks are observed in injection molded plaques made from such polypropylene. The specks result from the tendency of sodium benzoate to agglomerate during extrusion. It is to be noted that generally more than 0.05% by weight, as based upon the total composition of sodium benzoate is required in order to have a commercially useful effect on the crystallization rate of polypropylene. Another drawback is that volatile organic solvents as salting-out agents are required. Organic solvents are generally environmentally undesirable and often health hazards.

More detail as to the visual evaluation of sodium benzoate dispersions in polypropylene will be discussed in the examples.

Accordingly, a method for dispersing high melting, water soluble additives within a thermoplastic resin is needed. A high melting material is one that has a higher softening or melting point than the thermoplastic resin into which it is to be dispersed.

BRIEF DESCRIPTION OF THE INVENTION

It is an object of this invention to provide an improved method for dispersing water soluble, high melting additives such as, for example, nucleating agents including aromatic or aliphatic acid salts into a thermoplastic resin matrix for later use in an injection molding process.

It is an object of this invention to provide an improved method for dispersing sodium benzoate in polypropylene through the use of an aqueous solution.

Other objects of this invention will be clear to one of skill in the art based upon this specification.

The objects of this invention can be achieved by means of the following process: (1) thoroughly mixing an aqueous solution of an additive and a thermoplastic resin; (2) applying both sufficient heat and shear to rapidly volatilize said aqueous solvent and to form a molten flux or mass of said thermoplastic resin; and (3) recovering said thermoplastic resin with said additive therein. Recovering, throughout this specification and claims, includes for example pelletizing or scrap grinding. Pelletizing can be carried out for example either by transferring by means of a melt pump said molten flux and extruding it through a die as a strand which is later cut or chopped into pellets, or transferring said molten flux to a two-roll mill, then removing therefrom said resin with said additive in the form of a sheet which is first cooled and then diced or cut into pellets.

In general, any thermoplastic resin which is heat stable or can be heat stabilized so as not to significantly degrade during melt mixing can be used. Examples of such resins are polymers of alpha-olefins having up to 8 carbons such as polyethylene, polypropylene and copolymers thereof. Other resins that can be used in this invention are polystyrene, polyesters, and polyamides.

In somewhat greater detail, examples of resinous polymers of propylene useful in this invention are ones having a melting point of about 300° to 350° F. and include substantially crystalline homopolymeric polypropylene, propylene-ethylene block, random or multi-segment copolymers, etc. Of these, resinous polymers of propylene containing at least 75% by weight propylene and particularly substantially crystalline homopolymeric polypropylene are preferred because they have a higher melting point and are not sticky at slightly elevated temperatures.

In general, the nucleating agents and additives that can be used must be sufficiently water soluble so as not to require too much water to disperse a desired level of such an additive. The maximum percent by weight of a water solution that can be used is discussed hereinafter. Examples of such additives or nucleating agents are aromatic or aliphatic acids and their salts where the cation is for example aluminum, lithium, potassium, or sodium and the like. Nucleating agents often used with polypropylene are sodium, aluminum, potassium, calcium, or lithium salts of beta-naphthoic or benzoic acid, and sodium salts of cinnamic, caproic, glutamic, or cyclohexane carboxylic acid and the like.

The concentration of said additive in an aqueous solution can vary depending upon the inherent solubility of the additive. However, the additive must be substantially in solution before the application of both heat and shear. The concentration of a sodium benzoate solution useful in this invention will depend in part upon its temperature. The warmer the solution the more sodium benzoate that can be dissolved. Up to a saturated solution can be used, provided that after mixing said solution into a thermoplastic powder to form a blend thereof and prior to the application of both heat and shear to said blend sufficient to produce a molten flux, the sodium benzoate is substantially in solution.

The thermoplastic resin is necessarily in the form of a powder which has an apparent surface area of at least 0.1 meter square per gram. The apparent surface area is throughout this specification and claims defined to be the value determined according to the BET procedure hereinafter set out in an example. The sieve size distribution for a polymer useful in this invention requires that at least about 80% by weight and preferably at least 90% by weight of the polymer can pass through a screen number 20, i.e., one having openings of 841 microns, and at least 30% by weight and preferably at least 50% by weight of the polymer is retained by a screen number 200, i.e., one having openings of 74 microns. It is to be noted that there is no simple correlation between apparent surface area and particle size. However, thermoplastic resins, which satisfy the above sieve size distribution, have an apparent surface area of at least 0.1 meter square.

The particle size of the thermoplastic resin must be sufficiently small to provide a large enough apparent surface to adsorb all of the solution phase. There is no limit to the fineness of the particle size useful for this invention except for the fact that as the particle size becomes finer and finer, transferring or mixing such materials becomes more and more difficult.

The maximum percent by weight, as based on the weight of the thermoplastic powder, of a solution which can be used in this invention is dependent (1) upon the inherent solubility of the additive or nucleating agent within said solvent, (2) upon how much additive or nucleating agent is desired to be introduced into the thermoplastic resin powder, and (3) upon the adsorbing characteristics of the powder, which is in part a function of both the overall particle size and apparent surface area of the powder. As the overall particle size becomes smaller, or the apparent surface area increases, the ability to adsorb a water solution increases. In general, too much aqueous solution is present in a mixture if the consistency of the mixture is doughy or sticky. Preferably, the consistency of a powder-solution mixture is that of a superficially dry powder.

More specifically, for a given particle size distribution, apparent surface area and inherent adsorbing affinity of a powdered material, the maximum amount of aqueous solution capable of being introduced therein can be determined as follows: if less than about 5% remains within a Henschel Mill both after blending said material and said solution therein for about 10 minutes and after a normal discharge time during which time the Henschel Mill is operating and a discharge valve of the mill is open, then there has not been introduced too much aqueous solution. It is to be noted that the Henschel Mill has been selected as a criterion for too much aqueous solution because of the commercial desirability of using a Henschel Mill or the like for carrying out a process step of this invention.

The normal discharge time will depend upon the size of the Henschel Mill. For example, the normal discharge time for a 100 pound Henschel Mill is about one to two minutes.

Additional examples of equipment commercially available which can be used for thoroughly mixing an aqueous solution of an additive into a powder of thermoplastic resin are a Waring Blendor, and a pebble or ball mill. Preferably, the mixing action of equipment useful for this invention is positive with a minimum of unaffected areas or dead spots.

It has been found that it is critical that a hard to disperse additive be substantially in solution prior to the application of both heat and shear. If the mixture of the powder and the solution are dried prior to the application of both heat and shear, as in the case of a slurry mixing process, then a hard to disperse nucleating agent such as sodium benzoate does not remain uniformly distributed throughout the thermoplastic resin.

Examples of commercially available equipment for carrying out the process for applying both heat and shear are a Banbury Mill, a two-roll mill, a vented twin or single screw extruder, and a Farrell continuous mixer. It is to be noted that in the case of the mixer and the extruder insufficient venting for water can be a problem. It is in this regard that the Banbury and two-roll mill are especially useful because of their ability to readily vent off water.

Precisely what is occurring during the interval between the volatilization of all water and the formation of a molten flux of the thermoplastic resin is not known. What is known is that the advantages of this invention are not found after injection molding pellets of a material prepared by the steps of: (1) thoroughly mixing a powder of thermoplastic resin, such as stabilized 20-9109 polypropylene available from Amoco Chemicals Corporation, with an aqueous solution containing a non-melting additive such as sodium benzoate to form a mixture thereof; (2) drying said mixture in a forced air oven to form a dry blend; (3) melt mixing said blend by the application of heat and shear, as for example by means of a Banbury Mill, to form a kneaded molten flux; and (4) forming said molten flux into injection moldable pellets; whereas the advantages of this invention are found after injection molding pellets of a material prepared by the steps of (1) thoroughly mixing a powder of thermoplastic resin, such as stabilized 20-9109 polypropylene, and an aqueous solution containing a high melting or non-melting additive such as sodium benzoate to form a mixture thereof; (2) melt mixing said mixture by applying both heat and shear thereto, as for example by means of a Banbury Mill, so as to form a kneaded molten flux; and (3) forming said molten flux into injection moldable pellets.

It is to be noted that the onset of the formation of the molten flux need not occur immediately. It has been found for example that even though a molten flux of a thoroughly mixed composition of stabilized 20-9109 polypropylene powder and a water solution containing sodium benzoate did not form within 5 minutes in a Banbury Mill set at 310° F., and that the temperature of the Banbury Mill had to be increased to 385° F. in order to form a molten flux, that the pellets made from that molten flux and subsequently injection molded nevertheless provided the benefits of this invention.

In general, the temperature of the Banbury Mill appropriate for a particular thermoplastic resin will vary depending upon the melt flow or melt index of the polymer. For a high melt flow such as in the range 25-50, the mechanical energy provided by the operating Banbury alone is sufficient to melt the polymer with some cooling as needed to avoid degradation. For low flow rates of less than about 25, some preheating of the Banbury walls to between 275°-400° F. may be required. The melt flow rate is determined according to the appropriate ASTM test as is well known in the art. For example, in the case of polypropylene ASTM D1238 condition L is used, in the case of polyethylene the same ASTM but condition E, in the case of polystyrene the same ASTM but condition G, in the case of polyterephthalate the same ASTM but condition T, and finally in the case of nylon the same ASTM but condition K. For example, in the case of polypropylene having a melt flow rate in the range of about 1-10, the Banbury Mill is preferably preheated to at least 310° F. and more preferably to at least 385° F. whereas between 10 and 25 some initial heating followed by cooling may be required. Clearly as the flow rate approaches 25 the initial heating diminishes.

A particularly useful method for carrying out this invention comprises: (1) mixing in a Henschel Mill 100 parts by weight of polypropylene powder and between about 0.5 to about 31 parts by weight per 100 parts by weight polypropylene of a water solution which can be saturated but preferably comprises between about 0.05% and about 35% by weight, as based upon said water solution, of sodium benzoate; and (2) transferring said mixture to a two-roll mill where the mixture is subjected to both heat and shear whereby it is both melted and mixed to form a blend thereof; and (3) transferring said blend in the form of a cooled sheet to a dicer. Examples of suitable dicers that can be used are either a Bolton Emerson dicer or a Cumberland. Means for cooling the sheet after removal from the two-roll mill include a water bath, a forced air oven or a chill roll.

The temperature of each roll of a two-roll mill vary to some extent depending upon the particular thermoplastic resin being used. In general, the rolls must be at a sufficiently high temperature to either produce a molten flux from a powder when a powder was initially introduced into the mill or maintain in the form of a molten flux when a molten flux was initially introduced into the mill. As is known, one of the rolls of a two-roll mill is at a temperature which is at least 10° F. and preferably at least 50° F. and more preferably at least 70° F. lower than the temperature of the other roll. For example in order to induce a powder of polypropylene to become a molten flux on a two-roll mill, the hotter roll is at least 400° F. and preferably at least 385° F., but can be as low as 370° F. in some instances. For example in order to maintain polypropylene in the form of a molten flux, produced for example by means of a Banbury Mill, the hotter roll is at least 350° F. and preferably at least 325° F. but can in some instances be as low as 300° F.

DETAILED DESCRIPTION OF THE INVENTION

Note that the procedure for carrying out a particular step such as extruding, molding, using a two-roll or Banbury Mill, etc., is the same throughout and is described at least once in the section entitled *TWO-ROLL MILL METHOD*, unless otherwise provided.

VISUAL EVALUATION PROCEDURE

For each of the following methods evaluated, at least 6 test plaques were injection molded according to TABLE 3 set out hereinafter. Each such plaque was visually examined either against a black background or with light from a 100 watt bulb for the presence of any observable-to-the-eye specks or other discontinuities. Usually once one speck was observed, several others were later found.

In the case of the *Mortar and Pestle Method*, the *Ball Milling Method*, and the *Three-Roll Paint Mill Method* significant amounts of discontinuities, i.e., at least three or more specks, were observed, whereas in the case of the *TWO-ROLL METHOD* or *PREFERRED METHOD OF THIS INVENTION*, no such discontinuities were observed.

The failure of both the *Mortar and Pestle Method* and the *Ball Milling Method* to provide a visually satisfactory injection molded part is an important demonstration of how difficult it is to get a uniform dispersion of sodium benzoate in polypropylene.

TWO-ROLL MILL METHOD

Ten grams of sodium benzoate was dissolved in 20 grams of water at 170° F. to form a solution. This solution and 100 grams of heat stabilized 20-9109 polypropylene powder, having a melt flow of between 10 and 16 grams/10 minutes, were mixed in a Waring Blendor which was set for high speed. This mixing was continued for approximately 60 seconds. Two samples, A and B, were prepared as above. Sample A was allowed to dry for approximately 17 hours in a forced air draft oven set at 150° F. before transfer to a two-roll mill (see TABLE 1). Sample B was transferred to a two-roll mill (see TABLE 1) within about 3 minutes from the completion of mixing in the Waring Blendor but without additional drying beyond what occurred through unassisted evaporation.

TABLE 1

| SETTINGS FOR TWO-ROLL MILL | |
|---|---|
| FRONT ROLL | BACK ROLL |
| Length: 6 inches | Length: 6 inches |
| Diameter: 4 inches | Diameter: 4 inches |
| Temperature: 385° F. | Temperature: 325° F. |
| Revolutions per Minute: 30 | Revolutions per Minute: 42 |
| INITIAL GAP SETTING BETWEEN FRONT AND BACK ROLLS: | ABOUT 30 MILS. |

The gap between rolls was gradually increased to 50 mils over a period of about 5 minutes. After 5 minutes, the dispersing process which involved 15 passes was carried out. In each pass, the polymer which preferentially coated the back roll is separated from that roll by a doctor blade and fed back into the gap. After 15 such passes with refeeding, the material was removed as a 6" to 8" strip, cooled in a water bath at 175° F. and diced into approximately ⅛" cube shaped pellets.

To 100 parts by weight heat stabilized polypropylene powder 20-9109, one part by weight of pellets made either with Sample A or with Sample B were co-extruded in a 1" Killian compounding extruder (see TABLE 2).

TABLE 2

| SETTINGS FOR KILLIAN COMPOUND EXTRUDER ZONE TEMPERATURES |
|---|
| Rear Zone 425° F. |
| Genter Zone 425° F. |
| Front Zone 425° F. |
| Die Temperature 425° F. |
| Screw general purpose polypropylene compounding screw |
| Screw rate 100 revolutions per minute |

The material extruded from a Killian was passed through a die to produce a ⅛" strand. This strand was passed through a water bath at 72° F. and then chopped into ⅛" lengths. Pellets containing either Sample A or Sample B were then injection molded on a VanDorn injection molding press (see TABLE 3). Plaques having dimensions 2" by 3" by 50 mils were thus formed.

TABLE 3

| SETTING FOR VAN DORN INJECTION MOLDING PRESS | |
|---|---|
| Zone Temperature: | *Nozzle Temperature: 530° F. |
| Front: 550° F. | Injection Pressure: 5,000 psi |
| Center: 550° F. | Back Pressure: 1,000 psi |
| Rear: 530° F. | Mold open: 2 seconds |
| | Injection Time: 10 seconds |
| | Cure Time: 15 seconds |
| | Mold Temperature: 80° F. |
| | Shot Size: 3½" with ¼" excess or cushion |
| | Mold Cavity: 3½" by 4½" by 50 mils thick. |

*Standard injection press nozzle sold by IMS Company, Cleveland, Ohio.

MORTAR AND PESTLE METHOD

A mortar and pestle was used to finely grind the compositions listed in TABLE 4. The use of the mortar and pestle was continued until there was no observable change in the physical appearance of a particular composition.

TABLE 4

| MORTAR AND PESTLE COMPOSITIONS | |
|---|---|
| Composition | Ratio in Parts by Weight |
| 1 Sodium Benzoate: *Aerosol OT-B | 1:1 |
| 2 Sodium Benzoate: Renex 30 (ICI) | 1:1 |
| 3 Sodium Benzoate: Renex 36 (ICI) | 3:2 |
| 4 Sodium Benzoate: **Triton X 35 | 1:1 |
| 5 Sodium Benzoate: **Triton X 15 | 1:1 |

*Sold by American Cyanamid
**Not blended.

Fifty grams of Compositions 1-3 from the above table were introduced into a Waring Blendor with 2 pounds of stabilized 20-9109 polypropylene powder. The Blendor was set at high speed and ran for approximately 60 seconds. The material from the Blendor was transferred directly to a Killian compounding extruder, and then pelletized. The pellets so produced were injection molded. Compositions 4 and 5 with 2 pounds of stabilized 20-9109 polypropylene powder were intermixed in a polyethylene bag capable of holding six pounds of polypropylene powder and then introduced into a Killian (see TABLE 2) and extruded. The material so extruded was formed into pellets and injection molded (see TABLE 3).

BALL MILLING METHOD

Two 50-gram samples consisting of three parts by weight sodium benzoate to one part by weight Aerosol OT-B were each ball-milled. One was ball-milled for 8 hours and the other for 24 hours. Separately, each of these were mixed in a Waring Blendor with 100 grams of stabilized 20-9109 polypropylene powder, pelletized in a Killian (see TABLE 2) and finally molded into plaques (see TABLE 3).

THREE-ROLL PAINT MILL METHOD

About 50 grams of a composition consisting of mineral oil and sodium benzoate in a weight ratio of 1:1 were stirred together and then further mixed on an unheated three-roll paint mill. The consistency of the mixture was that of a sticky paste. One gram of this paste was mixed with 200 grams of stabilized 20-9109 polypropylene powder in a Waring Blendor set at high speed for approximately 60 seconds. The Waring blended mixture was then extruded from a Killian (see TABLE 2) and pelletized. The pelletized material was then injection molded (see TABLE 3).

PREFERRED METHOD OF THIS INVENTION

Ten pounds of sodium benzoate was dissolved in 21 pounds of water at approximately 170° F. The 31 pounds of this solution were then mixed for about 30 seconds in a Henschel Mill of 7.7 cubic feet with a working capacity of 5.4 cubic feet with 100 pounds of stabilized 17-9108 polypropylene powder, having a melt flow of between about 6-10 grams/10 minutes and being available from Amoco Chemicals Corporation, to form a superficially dry mixture with the consistency of a free flowing powder. The discharge time was less than 3 minutes.

The mixture from the Henschel Mill was introduced into a Banbury set at 385° F. In approximately one minute, all water was driven off and a molten flux was formed. From the Banbury, the molten flux was transferred to a two-roll mill (see TABLE 5).

TABLE 5

| SETTINGS FOR A TWO-ROLL MILL | |
|---|---|
| FRONT ROLL | BAKC ROLL |
| Length: 1500 millimeters (mm) | Length: 1500 mm. |
| Diameter: 55: mm. | Diameter: 550 mm. |
| Revolutions per Minute: 20.2 | Revolutions per Minute: 24.3 |
| TEMPERATURE: 320° F. | TEMPERATURE: 250° F. |

A continuous strip of material approximately 6 inches wide having a uniform thickness was removed from the two-roll mill, by techniques well known in the art. This strip was cooled in a water bath which was at 175° F. and taken to a dicer to form pellets. The material was diced into approximately ⅛" cube shaped pellets.

This diced material was then let down at a ratio of 100 to 1 with heat stabilized 17-9108 powder and then formed into pellets (see TABLE 2) and molded (see TABLE 3).

It is to be noted that the first time that a Banbury was used, the temperature was set at 310° F. Since no flux formed after 5 minutes the temperature was raised to 385° F. No adverse affect was observed on the injection molding results.

BET METHOD

The BET method and apparatus for determining the apparent surface area of a material is reported by S. Brunauer, P. H. Emmett, and E. Teller in the Journal of the American Chemical Society, 60, 309 (1938).

In summary, the method consists essentially of (1) adsorbing nitrogen on the surface of a sample at the temperature of liquid nitrogen from a controlled gas stream comprising nitrogen and helium; (nitrogen-helium gas mixtures are available from Matheson Company) (2) warming the sample to desorb the nitrogen, and (3) measuring the quantity of desorbed nitrogen by thermal conductivity. Calculation of the apparent surface area of the sample is made using a conventional BET equation or plot (see above cited reference).

It is to be noted that the results of the BET method are consistent with conventional volumetric methods for determining surface areas, but have been found to be more accurate.

The above examples are intended to exemplify the invention Variations on them are readily apparent to one of skill in the art. Such variation are intended to be part of this invention.

The invention which is claimed is:

1. A process for dispersing a nucleating agent into a thermoplastic resin comprising (1) thoroughly mixing an aqueous solution of the nucleating agent into a powder of the thermoplastic resin to form a superficially dry powder blend; (2) without prior drying applying sufficient heat and shear to such powder blend to rapidly volatilize water and to form a molten flux of the thermoplastic resin; and (3) recovering the thermoplastic resin with the nucleating dispersed therein.

2. The process of claim 1 wherein the thermoplastic resin is a polymer of an alpha-olefin having 2 to 8 carbon atoms.

3. The process of claim 2 wherein the thermoplastic resin comprises polyethylene, polypropylene or a copolymer of ethylene and propylene.

4. The process of claim 2 wherein the thermoplastic resin is polypropylene.

5. The process of claim 2 wherein the agent is an aliphatic or aromatic acid, or a salt thereof.

6. The process of claim 5 wherein the agent is sodium benzoate.

7. The process of claim 3 wherein the agent is an aliphatic or aromatic acid, or a salt thereof.

8. The process of claim 7 wherein the agent is sodium benzoate.

9. The process of claim 7 wherein the thermoplastic resin is polypropylene.

10. The process of claim 8 wherein the thermoplastic resin is polypropylene.

11. The process of claim 10 wherein between about 0.5 and about 31 parts by weight of aqueous solution are added to 100 parts of polypropylene powder and wherein the aqueous solution contains between about 0.05 wt.% and about 35 wt.% sodium benzoate.

12. A process for forming crystallized polypropylene having decreased specks comprising (1) thoroughly mixing between 0.5 to about 31 parts by weight of an aqueous solution of sodium benzoate with 100 parts of polypropylene powder; (2) without prior drying applying sufficient heat and shear to such mixture to rapidly volatilize water and to form a molten flux; and (3) recovering crystallized polypropylene containing at least 0.05 wt.% sodium benzoate.

13. The process of claim 12 wherein the polypropylene powder has an apparent area of at least 0.1 square meter per gram.

14. The process of claim 12 wherein the polypropylene has a melt flow rate less than 25 grams/10 minutes.

15. The process of claim 12 wherein heat and shear are applied in a Banbury Mill preheated to at least 310° F.

* * * * *